US012764500B2

(12) United States Patent
Belling et al.

(10) Patent No.: US 12,764,500 B2
(45) Date of Patent: *Oct. 13, 2026

(54) APPARATUS, METHOD, AND COMPUTER PROGRAM for updating a service area of a multicast session

(71) Applicant: NOKIA TECHNOLOGIES OY, Espoo (FI)

(72) Inventors: Horst Thomas Belling, Erding (DE); Philippe Godin, Versailles (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 662 days.

This patent is subject to a terminal disclaimer.

(21) Appl. No.: 17/876,367

(22) Filed: Jul. 28, 2022

(65) Prior Publication Data

US 2023/0036231 A1 Feb. 2, 2023

Related U.S. Application Data

(60) Provisional application No. 63/226,919, filed on Jul. 29, 2021.

(51) Int. Cl.

| | |
|---|---|
| ***H04W 4/06*** | (2009.01) |
| ***H04W 68/00*** | (2009.01) |
| ***H04W 76/30*** | (2018.01) |

(52) U.S. Cl.

CPC ........... *H04W 4/06* (2013.01); *H04W 68/005* (2013.01); *H04W 76/30* (2018.02)

(58) Field of Classification Search

CPC ...... H04W 4/06; H04W 68/005; H04W 76/30

See application file for complete search history.

(56) References Cited

U.S. PATENT DOCUMENTS

2012/0172028 A1* 7/2012 Korus .................. H04W 72/30 455/422.1

2018/0041353 A1* 2/2018 Lefebre .............. H04L 12/1845

(Continued)

OTHER PUBLICATIONS

LG Electronics: "KI#6 conclusion update", 3GPP Draft; S2-2101420, 3rd Generation Partnership Project (3GPP), Mobile Competence Centre ; 650, Route Des Lucioles ; F-06921 Sophia-Antipolis Cedex ; France vol. SA WG2, No. E (e-meeting); Feb. 24, 2021-Mar. 9, 2021 Mar. 9, 2021.

(Continued)

*Primary Examiner* — Thinh D Tran

(74) *Attorney, Agent, or Firm* — SQUIRE PATTON BOGGS (US) LLP

(57) ABSTRACT

An apparatus includes, in some embodiments, at least one processor and at least one memory storing instructions which, when executed by the at least on processor, causes the apparatus at least to receive a multicast service area update request comprising information defining a change in multicast service area for a multicast service session. A user equipment affected by the changed multicast service area is determined, as is a location of the user equipment affected by the changed multicast service area. It is determined whether the user equipment affected by the changed multicast service area is within the changed multicast service area. A protocol data unit session of the user equipment affected by the changed multicast service area is modified with information about the changed multicast service area, based on determining whether the user equipment affected by the changed multicast service area is within the changed multicast service area.

30 Claims, 12 Drawing Sheets

(56) References Cited

U.S. PATENT DOCUMENTS

| | | | | |
|---|---|---|---|---|
| 2019/0223250 | A1* | 7/2019 | Dao | H04W 72/23 |
| 2020/0170055 | A1* | 5/2020 | Dou | H04W 76/22 |
| 2021/0105196 | A1* | 4/2021 | Dao | H04L 43/026 |
| 2023/0164521 | A1* | 5/2023 | Li | H04W 76/40 370/312 |
| 2023/0209446 | A1* | 6/2023 | Kim | H04W 4/021 370/329 |
| 2024/0098761 | A1* | 3/2024 | Zhang | H04W 76/20 |
| 2024/0179802 | A1* | 5/2024 | Li | H04L 12/189 |

OTHER PUBLICATIONS

LG Electronics: "KI#6, Sol#20: Add area restriction info to NG-RAN", 3GPP Draft; S2-2008532, 3rd Generation Partnership Project (3GPP), Mobile Competence Centre ; 650, Route Des Lucioles ; F-06921 Sophia-Antipolis Cedex ; France vol. SA WG2, No. E (e-meeting) Elbonia; Nov. 16, 2020-Nov. 20, 2020 Nov. 9, 2022 (Nov. 9, 2020).

International Search Report and Written Opinion dated Nov. 18, 2022, corresponding to International Patent Application No. PCT/EP2022/071256.

3GPP TS 23.247 V1.0.0 (Jun. 2021), Technical Specification, 3rd Generation Partnership Project; Technical Specification Group Services and System Aspects; Architectural enhancements for 5G multicast-broadcast services; Stage 2 (Release 17), Jun. 2021.

European Communication pursuant to Article 94(3) EPC, corresponding to EP Application No. 22 758 447.1, dated Nov. 11, 2025.

3GPP TS 23.247 V17.9.0 (Dec. 2023), Technical Specification, 3rd Generation Partnership Project; Technical Specification Group Services and System Aspects; Architectural enhancements for 5G multicast-broadcast services; Stage 2 (Release 17), Dec. 2023.

3GPP TS 24.501 V17.13.0 (Dec. 2023), Technical Specification, 3rd Generation Partnership Project; Technical Specification Group Core Network and Terminals; Non-Access-Stratum (NAS) protocol for 5G System (5GS); Stage 3; (Release 17), Dec. 2023.

3GPP TS 24.501 V17.3.1 (Jun. 2021), Technical Specification, 3rd Generation Partnership Project; Technical Specification Group Core Network and Terminals; Non-Access-Stratum (NAS) protocol for 5G System (5GS); Stage 3; (Release 17), Jun. 2021.

* cited by examiner

APPARATUS, METHOD, AND COMPUTER PROGRAM for updating a service area of a multicast session

CROSS REFERENCE TO RELATED APPLICATION

This application claims the benefit of U.S. Provisional Application No. 63/226,919, filed Jul. 29, 2021. The entire content of the above-referenced application is hereby incorporated by reference.

FIELD OF THE DISCLOSURE

The present disclosure relates to an apparatus, a method, and a computer program for updating a service area of a multicast session.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

Multicasting is a service which enables one-to-many and many-to-many real-time communication in a network. Multicasting can serve large number of receiver devices while requiring neither prior knowledge of identities nor prior knowledge of the number of the receiver devices. A user can join a multicast session using signalling related to a unicast protocol data unit (PDU) session, and vice versa. During the transfer for unicast to multicast features such as quality of service (QoS) flows associated with the sessions shall be taken into account. Current proposals assume that information about the QoS flows for the multicast session are obtained from a Multicast Broadcast Session Management Function (MB-SMF).

SUMMARY

According to an aspect there is provided an apparatus comprising means configured to: receive at least one request to join a multicast service session from at least one user equipment within at least one protocol data unit session; store information that the at least one user equipment is participating in the multicast service session; receive and store information about at least one service area for the multicast service session; receive a multicast service area update request, the service area update request comprising information defining a change in multicast service area for the multicast service session; determine at least one user equipment affected by the multicast service based on the stored information about the at least one user equipment participating in the multicast service session; determine the location of the at least one affected user equipment; and for each of the at least one determined user equipment affected: determine whether the user equipment is inside or outside the changed service area and was inside or outside the stored service area, and modify the protocol data unit session with information about the changed service area and/or, based on the determination whether the user equipment is inside or outside the changed service area and was inside or outside the stored service area, with the addition or removal of information about the multicast session.

The means configured to determine the location of the user equipment may be configured to determine the location of the affected at least one user equipment for one of: for each network entity serving at least one of the affected at least one user equipment at least one list of the affected at least one user equipment served by that network entity; and for each of the determined affected user equipment.

The means may be further configured to inform each affected user equipment for the specific multicast service session about the changed service area The means configured to inform each affected user equipment within the multicast service session that the apparatus serves about the changed service area may be configured to provide information about the multicast session identifier and updated service area within a N1 message container.

The means configured to modify for each affected user equipment the protocol data unit session based on the determination whether the user equipment is inside or outside the changed service area and was inside or outside the stored service area, with the addition or removal of information about the multicast session may be configured to, for an affected user equipment previously inside the service area but following the update outside the updated service area of the multicast service session, signal towards the affected user equipment that the affected user equipment has been removed from the multicast service session in order to trigger the affected user equipment to release resources for the reception of multicast service session data.

The means configured to modify for each affected user equipment the protocol data unit session may be configured to update the protocol data unit session associated to the multicast service session with location dependent content within the indicated change in multicast location area.

The means configured to modify for each affected user equipment the protocol data unit session with information about the changed service area may be configured to update the protocol data unit session by sending an N2 service message container comprising: the multicast session identifier; possible area session identifier; and updated service area.

The means configured to modify for each affected user equipment the protocol data unit session based on the determination whether the user equipment is inside or outside the changed service area and was inside or outside the stored service area, with the addition or removal of information about the multicast session may be configured to, for a local multicast service session and for an affected UE which was previously outside the session service area but now inside the updated service area, add an associated unicast quality of service flow for the multicast service session to the protocol data unit session.

The means configured to modify for each affected user equipment the protocol data unit session procedure is configured to, for an affected user equipment which was previously inside the service area but now outside the updated service area, may signal one of: that the affected user equipment was removed from the multicast service session by removing all multicast service session related information from the protocol data unit session; and the removal of associated unicast quality of service flows for the multicast service session from the protocol data unit session.

The multicast service area update request may comprise a notification message comprising: subscription correlation information; service area information; and zero or more possible area session identifiers.

The apparatus may be configured to: subscribe at a further network entity for notifications about changes about the multicast session service area; provide the multicast session identifier as part of the subscription request to the further network entity; receive subscription correlation information in response to the subscription request from the further network entity; and determine the at least one affected user equipment based on the subscription correlation information identifying the multicast service session and the possible area session identifier.

According to a second aspect there is provided an apparatus comprising means configured to: receive a multicast service area update request, the service area update request comprising information defining a change in multicast service area for the multicast service session; determine at least one further network entity that serves the multicast session; and notify each of the at least one determined further network entities that serve the multicast session about the change in multicast service area for the multicast service session.

The notification about the change in multicast service area may comprise: subscription correlation information; service area information; and zero or more possible area session identifiers.

The means may be configured to: receive a subscription request from the further network entity with respect to notifications about changes of the multicast session service area; receive the multicast session identifier as part of the subscription request from the further network entity; assign a unique subscription correlation identifier to the subscription request; provide the subscription correlation information in response to the subscription request from the further network entity; and determine the at least one further network entity that serves the multicast session based on the subscription request.

The means may be configured to generate a multicast service area update request, the service area update request comprising information defining a change in multicast service area for the multicast service session, for at least one radio access network node that requested the transmission of data related to the multicast session towards itself The multicast service session update request may be sent only to the radio access network node if the radio access network node serves at least one cell that was in the previous multicast service area of the multicast session and is outside the updated multicast service area.

The multicast service area update request may be a N2 service message comprising: a temporary mobile group identity; service area; and possible area session identifier.

According to a third aspect there is provided an apparatus comprising means configured to: send at least one request to join a multicast service session: receive a notification about a changed service area for the multicast session; determine whether the apparatus is within the changed service are for the multicast session; and receive data and monitor radio signaling related to the multicast session only when determining that the apparatus is within the changed service area.

According to a fourth aspect there is provided an apparatus comprising means configured to: receive and store information that at least one user equipment served by the apparatus is participating in a multicast service session and about a service area for the multicast service session; exchange information with the at least one user equipment to monitor the cell the user equipment is residing in and to transmit data for the multicast service session towards the user equipment; receive a notification about a changed service area for the multicast service session; when a cell the apparatus serves where a user equipment participating in the multicast session is residing was within the previous stored multicast service session service area but is outside the changed multicast service session service area, end transmission of the related multicast service session data towards that cell; and when a cell the apparatus serves where a user equipment participating in the multicast session is residing was outside the previous multicast service session service area but is within the changed multicast service session service area, start transmission of the related multicast service session data towards that cell.

The means may be configured to, if the apparatus no longer serves a cell within the changed service area where a user equipment participating in the multicast service session is residing, send a request to a further network entity that the distribution of the multicast service session data towards itself is terminated.

The means may be configured to, if the apparatus did not serve any cell within the previous service area where a user equipment participating in the multicast service session is residing, but is serving at least one cell within the changed service area where a user equipment participating in the multicast service session is residing, request the distribution of the multicast service session data towards the radio access network node.

The notification about a changed service area for the multicast service session may be received within a modification of the protocol data unit session associated with the multicast service of one of the at least affected user equipment.

The notification about a changed service area for the multicast service session may be received within a non-UE associated activation message related to the multicast session.

According to a fifth aspect there is provided a method for an apparatus, the method comprising: receiving at least one request to join a multicast service session from at least one user equipment within at least one protocol data unit session; storing information that the at least one user equipment is participating in the multicast service session; receiving and storing information about at least one service area for the multicast service session; receiving a multicast service area update request, the service area update request comprising information defining a change in multicast service area for the multicast service session; determining at least one user equipment affected by the multicast service based on the stored information about the at least one user equipment participating in the multicast service session; determining the location of the at least one affected user equipment; and for each of the at least one determined user equipment affected: determining whether the user equipment is inside or outside the changed service area and was inside or outside the stored service area, and modifying the protocol data unit session with information about the changed service area and/or, based on the determination whether the user equipment is inside or outside the changed service area and was inside or outside the stored service area, with the addition or removal of information about the multicast session.

Determining the location of the user equipment may comprise determining the location of the affected at least one user equipment for one of: for each network entity serving at least one of the affected at least one user equipment at least one list of the affected at least one user equipment served by that network entity; and for each of the determined affected user equipment.

The method may further comprise informing each affected user equipment for the specific multicast service session about the changed service area.

Informing each affected user equipment within the multicast service session that the apparatus serves about the changed service area may comprise providing information about the multicast session identifier and updated service area within a N1 message container.

Modifying for each affected user equipment the protocol data unit session based on the determination whether the user equipment is inside or outside the changed service area and was inside or outside the stored service area, with the addition or removal of information about the multicast session may comprise, for an affected user equipment previously inside the service area but following the update outside the updated service area of the multicast service session, signalling towards the affected user equipment that the affected user equipment has been removed from the multicast service session in order to trigger the affected user equipment to release resources for the reception of multicast service session data.

Modifying for each affected user equipment the protocol data unit session may comprise updating the protocol data unit session associated to the multicast service session with location dependent content within the indicated change in multicast location area.

Modifying for each affected user equipment the protocol data unit session with information about the changed service area may comprise updating the protocol data unit session by sending an N2 service message container comprising: the multicast session identifier; possible area session identifier; and updated service area.

Modifying for each affected user equipment the protocol data unit session based on the determination whether the user equipment is inside or outside the changed service area and was inside or outside the stored service area, with the addition or removal of information about the multicast session may comprise, for a local multicast service session and for an affected UE which was previously outside the session service area but now inside the updated service area, adding an associated unicast quality of service flow for the multicast service session to the protocol data unit session.

Modifying for each affected user equipment the protocol data unit session procedure is configured to, for an affected user equipment which was previously inside the service area but now outside the updated service area, may comprise signalling one of: that the affected user equipment was removed from the multicast service session by removing all multicast service session related information from the protocol data unit session; and the removal of associated unicast quality of service flows for the multicast service session from the protocol data unit session.

The multicast service area update request may comprise a notification message comprising: subscription correlation information; service area information; and zero or more possible area session identifiers.

The method may comprise: subscribing at a further network entity for notifications about changes about the multicast session service area; providing the multicast session identifier as part of the subscription request to the further network entity; receiving subscription correlation information in response to the subscription request from the further network entity; and determining the at least one affected user equipment based on the subscription correlation information identifying the multicast service session and the possible area session identifier.

According to a fifth aspect there is provided a method, for an apparatus, the method comprising: receiving a multicast service area update request, the service area update request comprising information defining a change in multicast service area for the multicast service session; determining at least one further network entity that serves the multicast session; and notifying each of the at least one determined further network entities that serve the multicast session about the change in multicast service area for the multicast service session.

The notification about the change in multicast service area may comprise: subscription correlation information; service area information; and zero or more possible area session identifiers.

The method may further comprise: receiving a subscription request from the further network entity with respect to notifications about changes of the multicast session service area; receiving the multicast session identifier as part of the subscription request from the further network entity; assigning a unique subscription correlation identifier to the subscription request; providing the subscription correlation information in response to the subscription request from the further network entity; and determining the at least one further network entity that serves the multicast session based on the subscription request.

The method may comprise generating a multicast service area update request, the service area update request comprising information defining a change in multicast service area for the multicast service session, for at least one radio access network node that requested the transmission of data related to the multicast session towards itself The multicast service session update request may be sent only to the radio access network node if the radio access network node serves at least one cell that was in the previous multicast service area of the multicast session and is outside the updated multicast service area.

The multicast service area update request may be a N2 service message comprising: a temporary mobile group identity; service area; and possible area session identifier.

According to a seventh aspect there is provided a method for an apparatus, the method comprising: sending at least one request to join a multicast service session: receiving a notification about a changed service area for the multicast session; determining whether the apparatus is within the changed service are for the multicast session; and receiving data and monitor radio signaling related to the multicast session only when determining that the apparatus is within the changed service area.

According to an eighth aspect there is provided a method for an apparatus, the method comprising: receiving and storing information that at least one user equipment served by the apparatus is participating in a multicast service session and about a service area for the multicast service session; exchange information with the at least one user equipment to monitor the cell the user equipment is residing in and to transmit data for the multicast service session towards the user equipment; receiving a notification about a changed service area for the multicast service session; when a cell the apparatus serves where a user equipment participating in the multicast session is residing was within the previous stored multicast service session service area but is outside the changed multicast service session service area, ending transmission of the related multicast service session data towards that cell; and when a cell the apparatus serves where a user equipment participating in the multicast session is residing was outside the previous multicast service session service area but is within the changed multicast service session service area, starting transmission of the related multicast service session data towards that cell.

The method may comprise, if the apparatus no longer serves a cell within the changed service area where a user equipment participating in the multicast service session is residing, sending a request to a further network entity that the distribution of the multicast service session data towards itself is terminated.

The method may comprise, if the apparatus did not serve any cell within the previous service area where a user equipment participating in the multicast service session is residing, but is serving at least one cell within the changed service area where a user equipment participating in the multicast service session is residing, requesting the distribution of the multicast service session data towards the radio access network node.

The notification about a changed service area for the multicast service session may be received within a modification of the protocol data unit session associated with the multicast service of one of the at least affected user equipment.

The notification about a changed service area for the multicast service session may be received within a non-UE associated activation message related to the multicast session.

According to a ninth aspect there is provided an apparatus comprising at least one processor and at least one memory including computer code for one or more programs, the at least one memory and the computer code configured, with the at least one processor, to cause the apparatus at least to: receive at least one request to join a multicast service session from at least one user equipment within at least one protocol data unit session; store information that the at least one user equipment is participating in the multicast service session; receive and store information about at least one service area for the multicast service session; receive a multicast service area update request, the service area update request comprising information defining a change in multicast service area for the multicast service session; determine at least one user equipment affected by the multicast service based on the stored information about the at least one user equipment participating in the multicast service session; determine the location of the at least one affected user equipment; and for each of the at least one determined user equipment affected: determine whether the user equipment is inside or outside the changed service area and was inside or outside the stored service area, and modify the protocol data unit session with information about the changed service area and/or, based on the determination whether the user equipment is inside or outside the changed service area and was inside or outside the stored service area, with the addition or removal of information about the multicast session.

According to a tenth aspect there is provided an apparatus comprising at least one processor and at least one memory including computer code for one or more programs, the at least one memory and the computer code configured, with the at least one processor, to cause the apparatus at least to: receive a multicast service area update request, the service area update request comprising information defining a change in multicast service area for the multicast service session; determine at least one further network entity that serves the multicast session; and notify each of the at least one determined further network entities that serve the multicast session about the change in multicast service area for the multicast service session.

According to an eleventh aspect there is provided an apparatus comprising at least one processor and at least one memory including computer code for one or more programs, the at least one memory and the computer code configured, with the at least one processor, to cause the apparatus at least to: send at least one request to join a multicast service session: receive a notification about a changed service area for the multicast session; determine whether the apparatus is within the changed service are for the multicast session; and receive data and monitor radio signaling related to the multicast session only when determining that the apparatus is within the changed service area.

According to a twelfth aspect there is provided an apparatus comprising at least one processor and at least one memory including computer code for one or more programs, the at least one memory and the computer code configured, with the at least one processor, to cause the apparatus at least to: receive and store information that at least one user equipment served by the apparatus is participating in a multicast service session and about a service area for the multicast service session; exchange information with the at least one user equipment to monitor the cell the user equipment is residing in and to transmit data for the multicast service session towards the user equipment; receive a notification about a changed service area for the multicast service session; when a cell the apparatus serves where a user equipment participating in the multicast session is residing was within the previous stored multicast service session service area but is outside the changed multicast service session service area, end transmission of the related multicast service session data towards that cell; and when a cell the apparatus serves where a user equipment participating in the multicast session is residing was outside the previous multicast service session service area but is within the changed multicast service session service area, start transmission of the related multicast service session data towards that cell.

According to a thirteenth aspect there is provided an apparatus comprising: receiving circuitry configured to receive at least one request to join a multicast service session from at least one user equipment within at least one protocol data unit session; storing circuitry configured to store information that the at least one user equipment is participating in the multicast service session; receiving and storing circuitry configured to receive and store information about at least one service area for the multicast service session; receiving circuitry configured to receive a multicast service area update request, the service area update request comprising information defining a change in multicast service area for the multicast service session; determining circuitry configured to determine at least one user equipment affected by the multicast service based on the stored information about the at least one user equipment participating in the multicast service session; determining circuity configured to determine the location of the at least one affected user equipment; and for each of the at least one determined user equipment affected: determining circuitry configured to determine whether the user equipment is inside or outside the changed service area and was inside or outside the stored service area, and modifying circuitry configured to modify the protocol data unit session with information about the changed service area and/or, based on the determination whether the user equipment is inside or outside the changed service area and was inside or outside the stored service area, with the addition or removal of information about the multicast session.

According to a fourteenth aspect there is provided an apparatus comprising: receiving circuitry configured to receive a multicast service area update request, the service area update request comprising information defining a change in multicast service area for the multicast service session; determining circuitry configured to determine at least one further network entity that serves the multicast session; and notifying circuitry configured to notify each of the at least one determined further network entities that serve the multicast session about the change in multicast service area for the multicast service session.

According to a fifteenth aspect there is provided an apparatus comprising: sending circuitry configured to send at least one request to join a multicast service session: receiving circuitry configured to receive a notification about a changed service area for the multicast session; determining circuitry configured to determine whether the apparatus is within the changed service are for the multicast session; and receiving circuitry configured to receive data and monitor radio signaling related to the multicast session only when determining that the apparatus is within the changed service area.

According to a sixteenth aspect there is provided an apparatus comprising: receiving and storing circuitry configured to receive and store information that at least one user equipment served by the apparatus is participating in a multicast service session and about a service area for the multicast service session; exchanging circuitry configured to exchange information with the at least one user equipment to monitor the cell the user equipment is residing in and to transmit data for the multicast service session towards the user equipment; receiving circuitry configured to receive a notification about a changed service area for the multicast service session; when a cell the apparatus serves where a user equipment participating in the multicast session is residing was within the previous stored multicast service session service area but is outside the changed multicast service session service area, ending circuitry configured to end transmission of the related multicast service session data towards that cell; and when a cell the apparatus serves where a user equipment participating in the multicast session is residing was outside the previous multicast service session service area but is within the changed multicast service session service area, starting circuitry configured to start transmission of the related multicast service session data towards that cell.

According to a seventeenth aspect there is provided an apparatus comprising: means for receiving at least one request to join a multicast service session from at least one user equipment within at least one protocol data unit session; means for storing information that the at least one user equipment is participating in the multicast service session; means for receiving and storing information about at least one service area for the multicast service session; means for receiving a multicast service area update request, the service area update request comprising information defining a change in multicast service area for the multicast service session; means for determining at least one user equipment affected by the multicast service based on the stored information about the at least one user equipment participating in the multicast service session; means for determining the location of the at least one affected user equipment; and for each of the at least one determined user equipment affected: means for determining whether the user equipment is inside or outside the changed service area and was inside or outside the stored service area, and means for modifying the protocol data unit session with information about the changed service area and/or, based on the determination whether the user equipment is inside or outside the changed service area and was inside or outside the stored service area, with the addition or removal of information about the multicast session.

According to an eighteenth aspect there is provided an apparatus comprising: means for receiving a multicast service area update request, the service area update request comprising information defining a change in multicast service area for the multicast service session; means for determining at least one further network entity that serves the multicast session; and means for notifying each of the at least one determined further network entities that serve the multicast session about the change in multicast service area for the multicast service session.

According to a nineteenth aspect there is provided an apparatus comprising: means for sending at least one request to join a multicast service session: means for receiving a notification about a changed service area for the multicast session; means for determining whether the apparatus is within the changed service are for the multicast session; and means for receiving data and monitor radio signaling related to the multicast session only when determining that the apparatus is within the changed service area.

According to a twentieth aspect there is provided an apparatus comprising: means for receiving and storing information that at least one user equipment served by the apparatus is participating in a multicast service session and about a service area for the multicast service session; means for exchanging information with the at least one user equipment to monitor the cell the user equipment is residing in and to transmit data for the multicast service session towards the user equipment; means for receiving a notification about a changed service area for the multicast service session; when a cell the apparatus serves where a user equipment participating in the multicast session is residing was within the previous stored multicast service session service area but is outside the changed multicast service session service area, means for ending transmission of the related multicast service session data towards that cell; and when a cell the apparatus serves where a user equipment participating in the multicast session is residing was outside the previous multicast service session service area but is within the changed multicast service session service area, means for starting transmission of the related multicast service session data towards that cell.

According to an aspect, there is provided a computer readable medium comprising program instructions for causing an apparatus to perform at least the method according to any of the preceding aspects.

According to an aspect, there is provided a non-transitory computer readable medium comprising program instructions for causing an apparatus to perform at least the method according to any of the preceding aspects.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
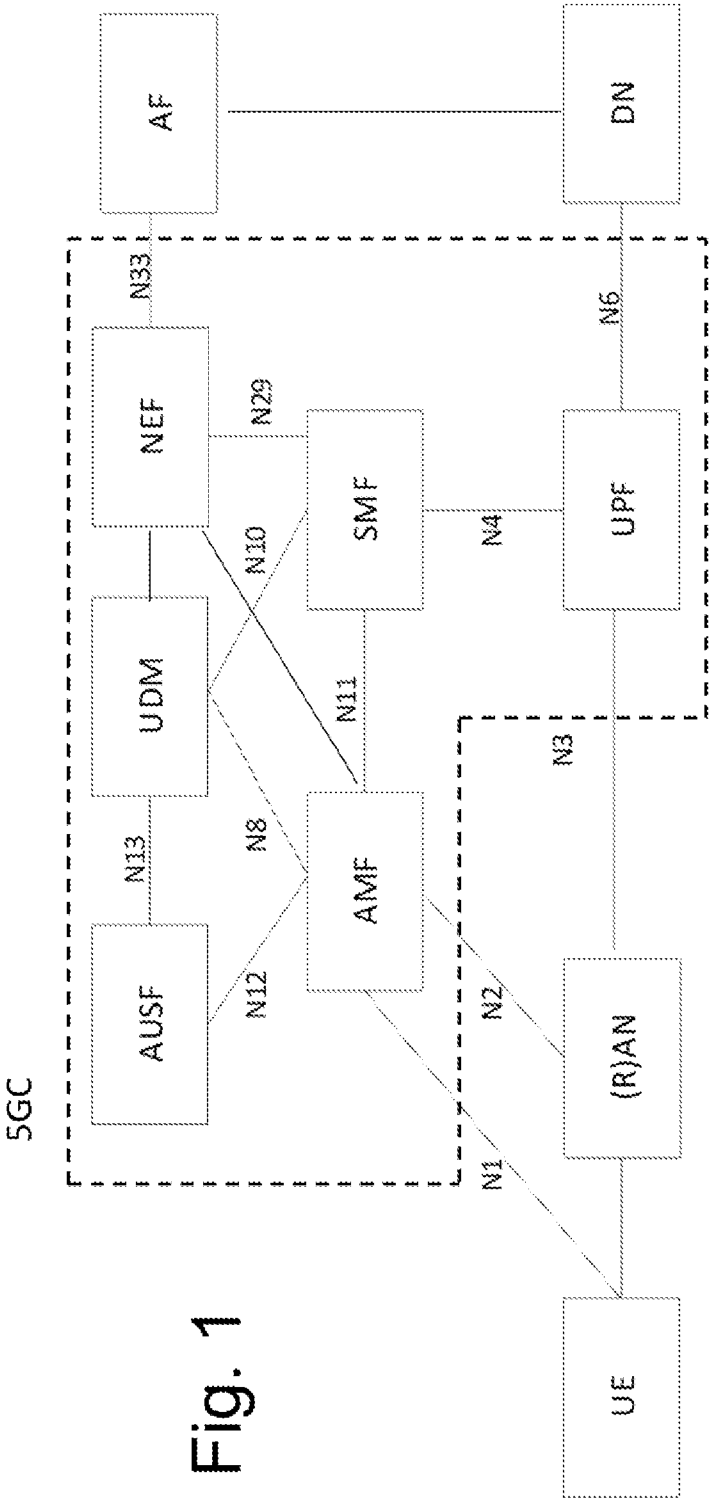
FIG. 1 shows a schematic representation of a 5G communications system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit (DU) functions connected to one or more gNodeB (gNB) centralized unit (CU) functions.

The 5GC may comprise an access and mobility management function (AMF), a session management function (SMF), an authentication server function (AUSF), a user data management (UDM), a user plane function (UPF), a network exposure function (NEF) and/or other network functions (NFs) not represented such as an operation administration and maintenance (OAM) NF.

Figure 2:
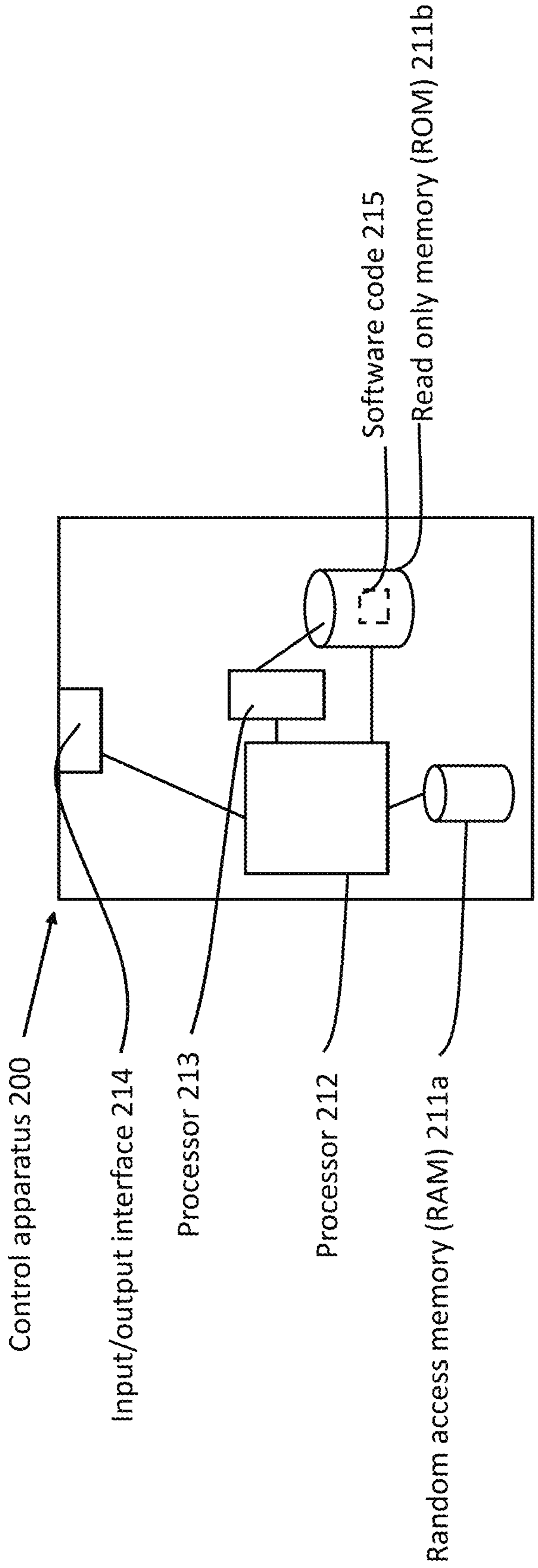
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a,* at least on read only memory (ROM) 211*b,* at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
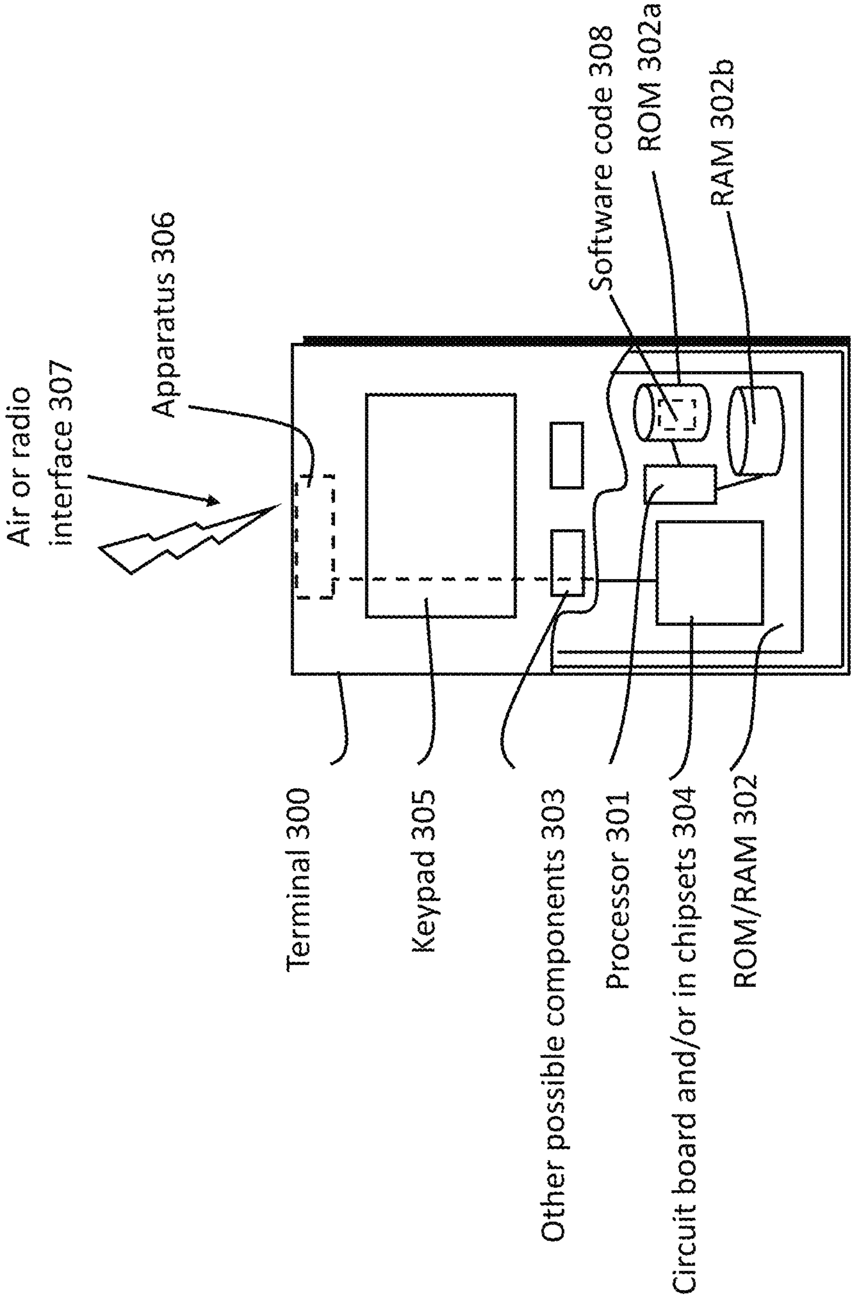
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3, transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a,* at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

TS 23.247 discloses the following with respect to a local multi-broadcast A Local Multicast/Broadcast Service (MBS) is a MBS service provided in one or several MBS service area(s). An MBS service area is identified by a cell list or a tracking area list. Only UEs within the MBS service area may receive content data, while UEs outside the MBS service area are not allowed to receive location specific content. For multicast communication, UEs outside the MBS service area are not allowed to join the MBS service, and the network shall not deliver location specific content anymore to the UEs moved out of the MBS service area. The UE shall be able to obtain service area information of the local multicast service via MBS service announcement or via Non-Access Stratum (NAS) signalling (UE Session Join Accept/Reject including Cell ID list or TAI list). If the UE Session Join procedure fails due to the UE being outside the multicast service area, the UE does not attempt to join the multicast session again until the UE moves inside the multicast service area. When the UE Session Join succeeds and if the multicast session is deactivated, the UE does not perform monitoring the session activation notification and any other information related to the multicast session identified by an MBS Session identifier (ID) over the radio if outside the multicast service area.

Furthermore a location dependent MBS is a local MBS that is provided in several MBS service areas. The location dependent MBS service enables distribution of different content data to different MBS service areas. The same MBS Session ID is used but a different Area Session ID is used for each MBS service area. The Area Session ID is used, in combination with MBS Session ID, to uniquely identify the service area specific part of the MBS service within a 5GS. The network supports the location-dependent content distribution for the location dependent MBS services, while UEs are only aware of the MBS Session ID (in other words UEs are not required to be aware of the Area Session IDs). When UEs move to a new MBS service area, content data from the new MBS service area is delivered to the UE, and the network ceases to deliver the content data from the old MBS service areas to the UE.

Information about different MBS service areas for a location dependent MBS service may be provided by one or several application functions (AFs) or may be configured. Different ingress points for location dependent points for the MBS session are supported for different MBS service area dependent content of the MBS session; different Multicast/Broadcast Session Management Functions (MB-SMFs) and/or Multicast/Broadcast User Plane Function MB-UPF may be assigned for different MBS service areas in an MBS session.

The Area Session ID is allocated by MB-SMF in MBS Session Establishment procedure. MB-SMF allocates Area Session ID for each MBS services area which is unique within the MBS session. MB-SMF needs to further ensure there is no MBS service area overlapping with other MBS service areas that share the same MBS session ID.

Currently according to clauses 7.1.1.5 and 7.1.1.6 of TS 23.247, the application function (AF) can be configured to update the Multicast/Broadcast (MB) service area.

Furthermore clause 7.2.6 of TS 23.247 discusses a sequence wherein the MB-SMF triggers a session update. Following the session update then then the MB-SMF is configured to generate a quality of service (QoS) profile for the multicast, and sends the MBS Session update Request to the Access and Mobility Management Function(s) (AMF(s)). The request can be a N2 session management (SM) message comprising the temporary mobile group identity (TMGI), QoS profiles for multicast. Furthermore the involved AMF can then be configured to forward the N2 SM information received from the MB-SMF to the radio access network (RAN) nodes via a next generation application protocol (NGAP) session update request. This request can furthermore be a N2 SM message comprising the temporary mobile group identity (TMGI), QoS profiles for multicast information. The next generation-radio access network (NG-RAN) can then be configured to update the MBS session context, and if only the allocation and retention policy (ARP) of QoS parameters is updated, the NG-RAN node also updates the QoS parameters of the associating protocol data unit (PDU) sessions. Furthermore the NG-RAN is configured to acknowledge the NGAP Session update Request by sending an NGAP Session update Response message to the AMF However there is currently no solution disclosed on to determine whether it is the AMF or the MB-SMF that stores RAN ID for the interaction with RAN nor how to update the associated PDU Session's QoS based on the update of MBS Session QoS by NG-RAN.

The concept as discussed in the embodiments herein in further detail are configured such that when an MB-SMF is informed about the change of the service area for a multicast session in a restricted area, the MB-SMF is configured to inform each SMF having registered for notifications concerning the multicast session about the changed service area.

In some embodiments each SMF is configured to inform each UE that has joined the multicast session and that the SMF serves about the changed service area. Furthermore in some embodiments an SMF can be configured to remove UEs which were previously inside the service area but now are outside the updated service area from the multicast session. In some embodiments each SMF is also configured to update the PDU session associated to the multicast session with the new service area.

In such embodiments if a UE was previously outside the service area but is inside the updated service area, the SMF is configured to also add associated QoS flows for the multicast session to the PDU session. Additionally in some embodiments where a UE was previously inside the service area but is now outside the updated service area, the SMF Is configured to also remove associated QoS flows for the multicast session from the PDU session.

In some embodiments when a RAN node is informed about an updated service area of the multicast session and some cells it served previously within the service area are outside the updated service area the RAN is configured to end transmission of the related multicast data towards those cells. Furthermore in some embodiments when a RAN node is informed via the SMF about an updated service area of the multicast session and some cells the RAN node serves were previously outside the service area but are now inside the updated service area, the RAN node is configured to start transmission of the related multicast data towards those cells.

In some embodiments similar procedures are applicable for the change of a location area for a multicast session with location-dependent content, but the area session ID is considered in addition to the MBS session ID by MB-SMF, SMF, AMF and RAN node, and there are no notifications about the changed service area towards the UE.

In some embodiments when the AF updates the service area for a multicast session, it can be configured to inform UEs at an application level. The AF furthermore can be configured to also inform the MB-SMF according to any suitable manner (for example according to a suitable standard via a network exposure function (NEF)/Multicast/Broadcast service function (MBSF)/Policy Control Function (PCF) about the change of the service area for a multicast session in a restricted area or about the change of a service area for a multicast session with location dependent content.

For a multicast session in a restricted area, the in some embodiments the MB-SMF is configured to inform each SMF having registered for notifications concerning the multicast session about the changed service area.

Each SMF can furthermore be configured to inform each UE that joined the multicast session and that it serves about the changed service area.

An SMF in some embodiments is configured to remove UEs previously inside the service area but now outside the updated service area from the multicast session. In some embodiments, when all UEs happen to leave a given NG-RAN node, the MBS context can be implicitly removed from the NG-RAN node.

The SMF furthermore can be configured to update the protocol data unit (PDU) session associated to the multicast session with the new service area.

In some embodiments when a UE was previously outside the service area but is inside the updated service area, the SMF can be configured to also add associated (unicast) quality of service (QoS) flows for the multicast session to the PDU session.

When a UE was previously inside the service area but is then outside the updated service area, the SMF can be configured to also remove associated QoS flows for the multicast session from the PDU session.

In some embodiments the MB-SMF is configured to also inform (via the AMF) each RAN node handling the multicast session about the updated service area. Furthermore the MB-SMF can be configured in some embodiments alternatively inform only RAN nodes handling the multicast session but where the multicast service area was restricted in such a way that some or all cells served by the RAN node are outside the updated multicast service area.

When a RAN node is informed via the SMF or the MB-SMF about an updated service area of the multicast session and some cells it served previously within the service area are outside the updated service area the RAN node can be configured to end transmission of the related multicast data towards those cells. Furthermore in some embodiments where the RAN node no longer serves any cells within the service area with users inside the multicast session, the RAN node is configured to request (via the AMF) from the MB-SMF that the distribution of the multicast data towards the RAN node is terminated and the RAN node is further configured to removes the RAN node MBS context.

In some embodiments, when a RAN node is informed via the SMF about an updated service area of the multicast session and some cells the RAN node serves were previously outside the service area but are now inside the updated service area, the RAN node can be configured to start transmission of the related multicast data towards those cells.

Furthermore in some embodiments where the RAN node previously did not serve any cells within the service area with users inside the multicast session, the RAN node can be configured to also request (via AMF) from the MB-SMF the distribution of the multicast data towards the RAN node.

Figure 4:
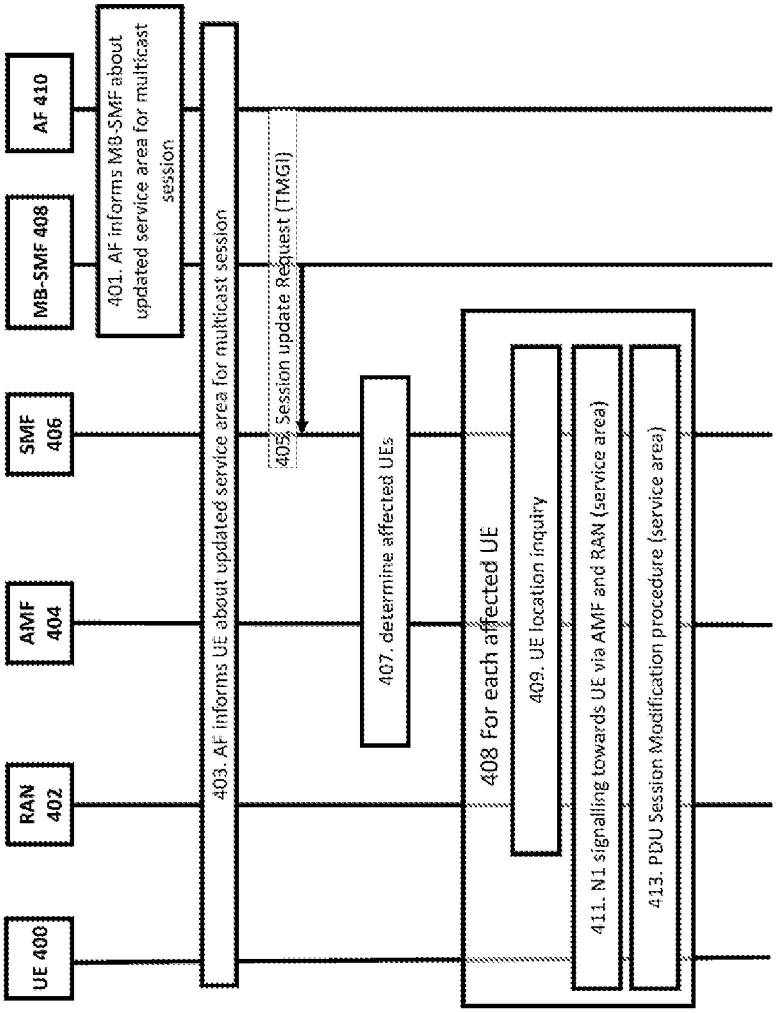
FIG. 4 shows a workflow diagram with respect to an example multicast session update procedure according to some embodiments.

In some embodiments there can be employed similar procedures for the change of a location area for a multicast session with location-dependent content, but the area session ID is considered in addition to the MBS session ID by MB-SMF, SMF, AMF and RAN node, and there are no notifications about the changed service area towards the UE With respect to FIG. 4 is shown a workflow diagram with respect to an example multicast session update procedure according to some embodiments.

In this example workflow is shown within a system comprising a UE 400, RAN node (gNB) 402, AMF 404, SMF 406, MB-SMF 408 and AF 410.

In some embodiments the procedure is triggered by the AF 410 informing the MB-SMF 408 about an updated service area for multicast session as shown in FIG. 4 by step 401.

The AF 410 furthermore is configured to inform the UE 400 about the updated service area at the application level via a service announcement as shown in FIG. 4 by step 403. In some embodiments if a UE is located in a radio cell which was previously outside the service area and is now inside the updated service area, the UE may be configured to join the multicast service.

In some embodiments the MB-SMF 408, as shown in FIG. 4 by step 405, is configured to send a session update request. The session update request can be designated as a Nmbsmf_Information_Notify (subscription correlation info, event: "service area update", service area, possible Area Session ID) to each SMF with a related subscription.

In such embodiments it is assumed that each SMF 406 serving UEs 400 within the multicast session is configured to perform a related subscription for the multicast session at the MB-SMF 408 when the first such UE 400 joins.

In some embodiments, as shown in FIG. 4 by step 407, the SMF 406 is configured to determine the affected UEs 400 the SMF 406 serves (which have joined the multicast session) based on the subscription correlation identifying the multicast session and the possible Area Session ID included in the message as shown in step 405.

Having determined the affected UE 400 the subsequent steps 409, 411 and 413 can be executed separately for each affected UE.

In some embodiments signalling related to steps 411 and 413 can be combined in the same messages between the SMF 406 and AMF 404, and between the AMF 404 and the RAN node 402. For example as PDU session modify request/response messages.

In some other embodiments the step 409 is implemented for a list of UEs and then only steps 411 and 413 implemented separately for each affected UE. In such embodiments the location determination is for at least one list of the affected at least one user equipment served by a network entity serving a least one of the affected at least one user equipment.

For example in some embodiments as shown in FIG. 4 by step 409 the SMF 406 is configured to query the AMF 404 or RAN (for example the RAN nodes 402) for the current location of the UE 400. In some embodiments the current location is provided to the SMF 406 in the form of the cell ID and/or TAI. In some embodiments the SMF can then be configured to determine whether the UE is within the updated service area based on this location determination and the information provided within the session update request message.

In some embodiments alternatively the SMF 406 is configured to query each AMF 404 serving affected UEs for the current location of all the affected UE served by that AMF 404 in a non-UE-associated message.

Having identified affected the UEs then, for a local multicast session without location-dependent content, the SMF 406 is configured to inform each UE within the multicast session that it serves about the changed service area by providing information about the multicast session ID and updated service area in a N1 container 11 as shown in FIG. 4 by step 411.

Furthermore the SMF is configured to signal to the UE that it has been removed from the multicast session to trigger UE resources for the reception of multicast data to be released and/or a related notification towards the user as shown in FIG. 6 by step 605.

Then as shown in FIG. 4 by step 413 there is a PDU session modification procedure.

Figure 5A:
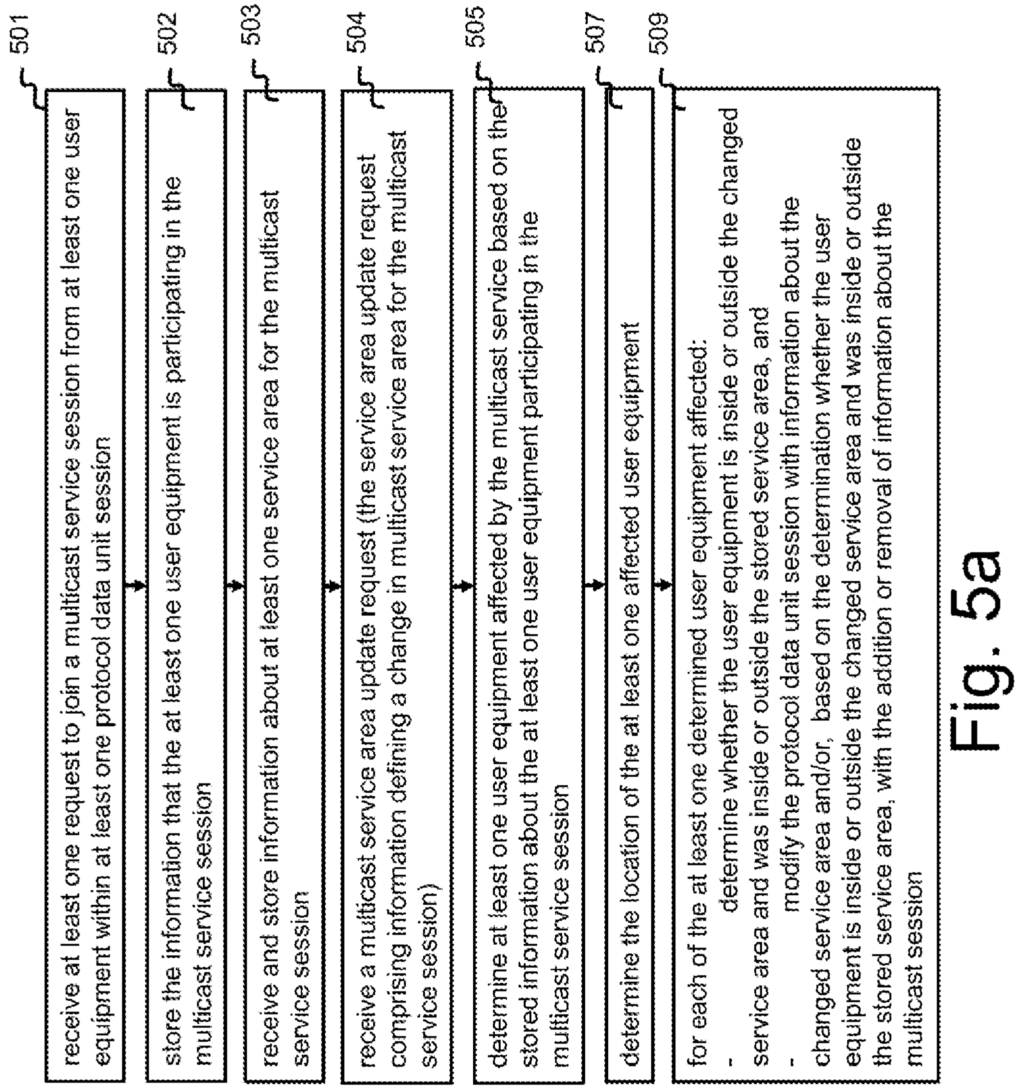
FIGS. 5*a* to 5*d* show example flow diagrams showing local multicast session update operations with respect to a SMF, MB-SMF, UE and RAN according to some embodiments.

FIG. 5*a*, shows a flow diagram of a series of operations with respect to the SMF 406 according to some embodiments.

Thus in some embodiments, as shown in FIG. 5*a* by step 501, the SMF is configured to receive at least one request to join a multicast service session from at least one user equipment within at least one protocol data unit session.

The SMF furthermore is configured, as shown in FIG. 5*a* by step 502, to store the information that the at least one user equipment is participating in the multicast service session.

Further as shown in FIG. 5*a* by step 503, the SMF is configured to receive and store information about at least one service area for the multicast service session.

Furthermore, with respect to the SMF, as shown in FIG. 5*a* by step 504 then receive a multicast service area update request (the service area update request comprising information defining a change in multicast service area for the multicast service session).

The SMF furthermore can be configured to, as shown in FIG. 5*a* by step 505, determine at least one user equipment affected by the multicast service based on the stored information about the user equipment participating jn the multicast service session.

Having determined the affected user equipment the location of the affected user equipment is determined as shown in FIG. 5*a* by step 507.

Then for each of the determined user equipment affected, as shown in FIG. 5*a* by step 509, then determine whether the user affected equipment is inside or outside the changed service area and was inside or outside the stored service area, and modify the protocol data unit session with information about the changed service area and/or based on the determination whether the user equipment is inside or outside the changed service area and was inside or outside the stored service area, with the addition or removal of information about the multicast session.

Figure 5B:
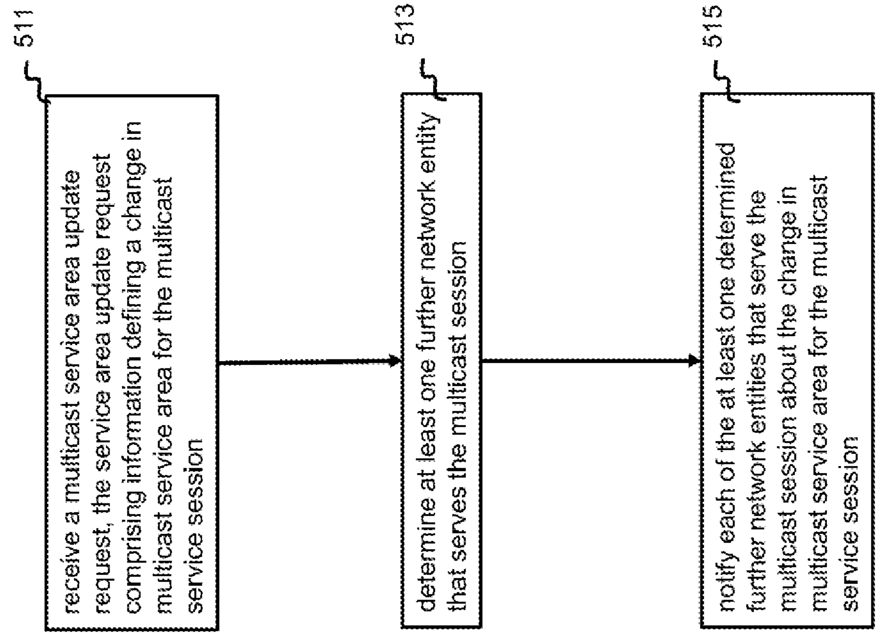

FIG. 5*b*, shows a flow diagram of a series of operations with respect to the multicast broadcast session management function (MB-SMF) 408 according to some embodiments. The MB-SMF is configured to receive a multicast service area update request, the service area update request comprising information defining a change in multicast service area for the multicast service session.

Furthermore, as shown in FIG. 5*b* by step 513, the multicast broadcast session management function (MB-SMF) 408 is configured to determine at least one further network entity that serves the multicast session.

The multicast broadcast session management function (MB-SMF) 408 is then configured, as shown in FIG. 5*b* by step 515, to notify each of the at least one determined further network entities that serve the multicast session about the change in multicast service area for the multicast service session. The notification about the change in multicast service area in some embodiments comprises: subscription correlation information; service area information; and zero or more possible area session identifiers.

Furthermore in some embodiments the MB-SMF is configured to receive a subscription request from the further network entity to notifications about changes about the multicast session service area. The MB-SMF furthermore is configured to receive a multicast session identifier as part of the subscription request from the second network entity. The MB-SMF then can be configured to assign a unique subscription correlation identifier to the subscription request and provide the subscription correlation information in response to the subscription request from the further network entity. Then the MB-SMF can be configured to determine the at least one second network entity that serves the multicast session based on the subscription request.

Figure 5C:
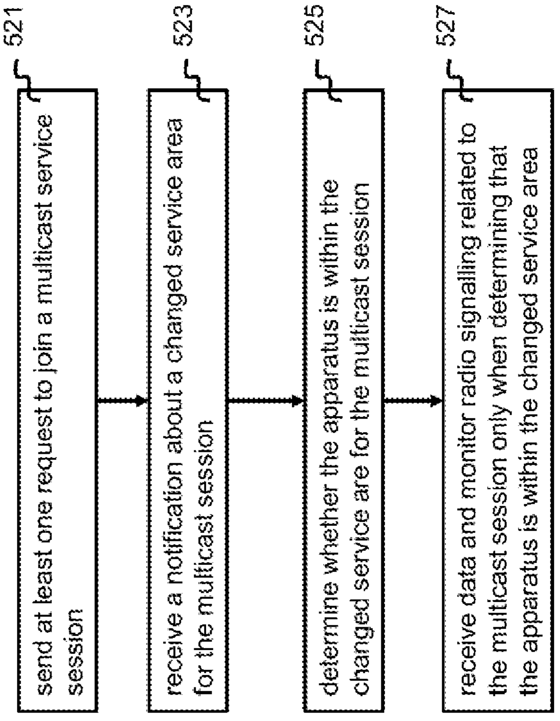

FIG. 5*c*, shows a flow diagram of a series of operations with respect to the user equipment according to some embodiments.

In such embodiments the user equipment (UE) is configured to send at least one request to join a multicast service session as shown in FIG. 5*c* by step 521.

The UE can furthermore be configured to receive a notification about a changed service area for the multicast session as shown in FIG. 5*c* by step 523.

Furthermore as shown in FIG. 5*c* by step 525 the UE can be configured to determine whether it is within the changed service area for the multicast session.

Then the UE can furthermore be configured, as shown in FIG. 5*c* by step 527 to receive data and monitor radio signaling related to the multicast session only when determining that the apparatus is within the changed service area.

Figure 5D:
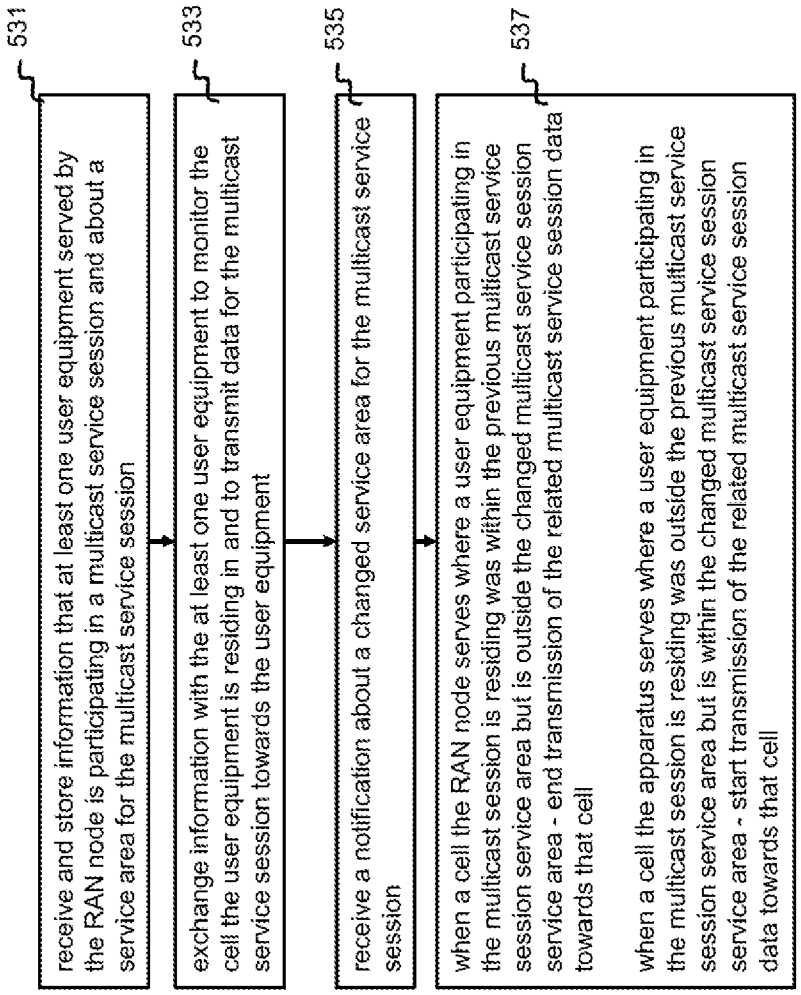

FIG. 5*d*, shows a flow diagram of a series of operations with respect to the RAN node according to some embodiments.

As shown in FIG. 5*d* in step 531, the RAN node can be configured to receive and store information that at least one user equipment served by the RAN node is participating in a multicast service session and about a service area for the multicast service session.

Then as shown in FIG. 5*d* by step 533, the RAN node is configured to exchange information with the at least one user equipment to monitor the cell the user equipment is residing in and to transmit data for the multicast service session towards the user equipment.

Furthermore the RAN node is configured to receive a notification about a changed service area for the multicast service session as shown in FIG. 5*d* by step 535.

The RAN node can then in some embodiments be configured, as shown in FIG. 5*d* by step 537, when a cell the RAN node serves where a user equipment participating in the multicast session is residing was within the previous multicast service session service area but is outside the changed multicast service session service area to end transmission of the related multicast service session data towards that cell. Furthermore when a cell the apparatus serves where a user equipment participating in the multicast session is residing was outside the previous multicast service session service area but is within the changed multicast service session service area the RAN node is configured to start transmission of the related multicast service session data towards that cell.

Figure 6A:
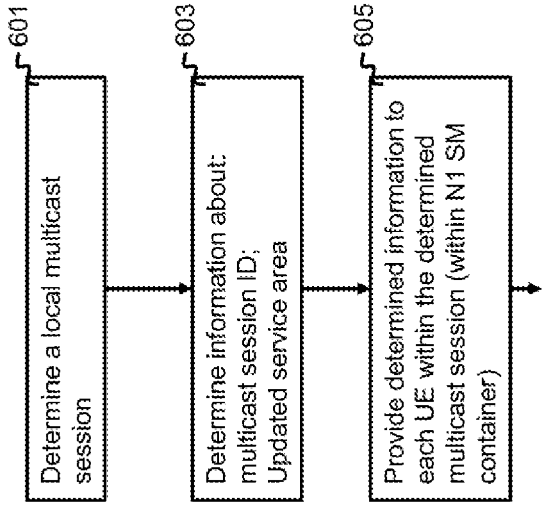
FIG. 6*a* shows an example flow diagram showing local multicast session without location-dependent content update operations according to some embodiments.

Furthermore FIG. 6*a* shows an example of informing each affected user equipment for the specific multicast service session about the changed service area for a local multicast service session. This is shown in FIG. 6*a* wherein the first operation is one of determining a multicast session within the indicated location area as shown in step 601.

Then, as shown in step 603, the following information can be determined: multicast session ID and updated service area.

The determined information can then be provided to each UE within the determined multicast session (within the N1 SM container) as shown in FIG. 6*a* by step 505.

Figure 6B:
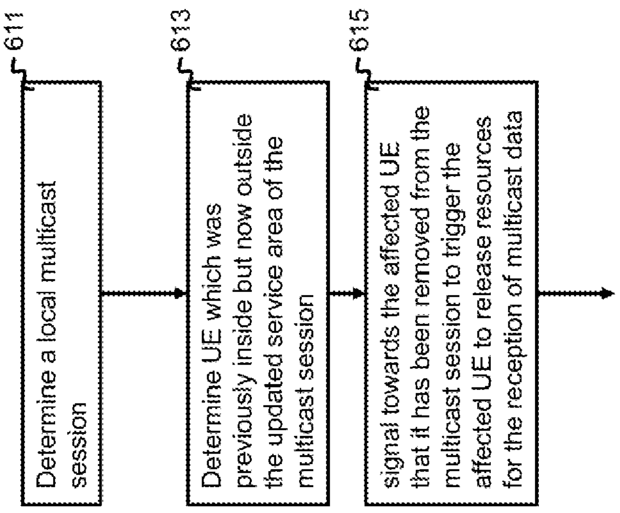
FIG. 6*b* shows an example flow diagram showing local multicast session with location-dependent content update operations according to some embodiments.

With respect to FIG. 6*b* an example flow diagram is shown where the SMF is configured to inform each affected user equipment where there is a local multicast session. Thus for example as shown in step 611 the SMF is configured to determine a local multicast session.

Then the SMF is configured to determine a determine a UE which was previously inside but now outside the updated service area of the multicast session as shown in FIG. 6*b* by step 613.

The SMF can then be configured to signal towards the affected user equipment that the affected user equipment has been removed from the multicast service session in order to trigger the affected user equipment to release resources for the reception of multicast service session data as shown in FIG. 6*b* by step 615.

Figure 7A:
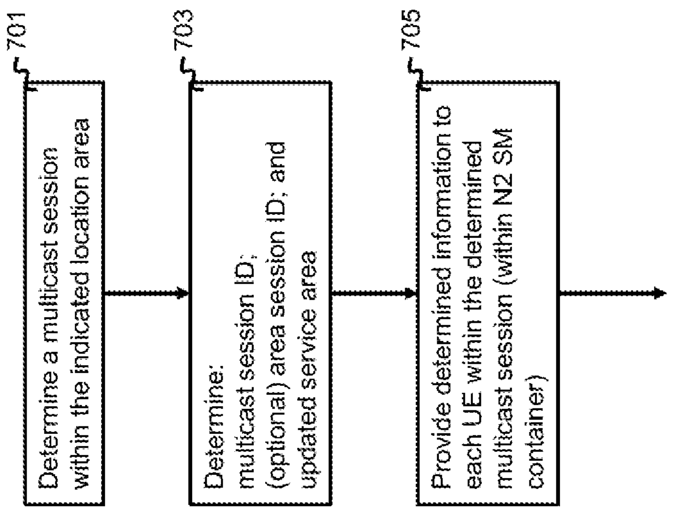
FIGS. 7*a* to 7*c* show example flow diagrams showing protocol data unit update operations with respect to the SMF according to some embodiments.
Figure 7B:
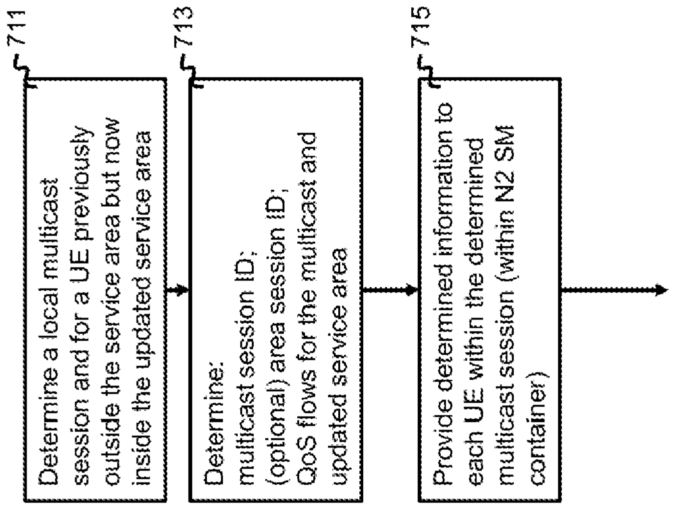
Figure 7C:
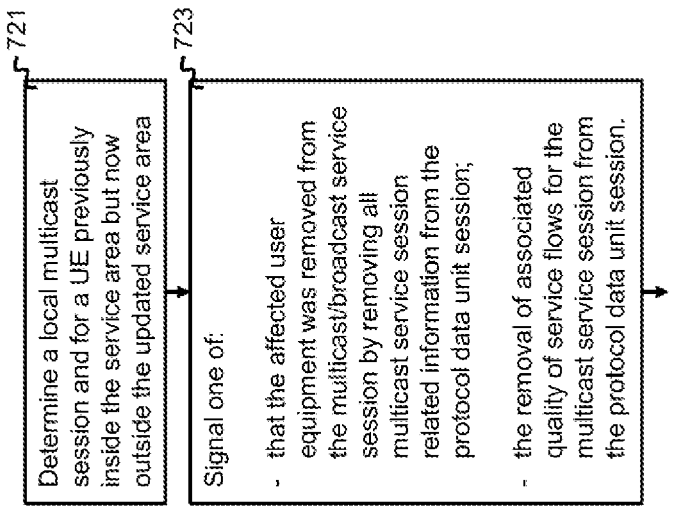

FIGS. 7*a* to 7*c* show example flow diagrams of the protocol data unit update operations with respect to the SMF according to some embodiments. For example as shown in FIG. 7*a* the SMF can be configured to determine a multicast session with location dependent content within the indicated location area as shown in step 701.

Following this the SMF determines the affected multicast session ID, possible area session ID, and updated service area as shown in FIG. 7*a* by step 703.

The SMF can then be configured then provides in a N2 SM container the multicast session ID, possible area session ID, and updated service area as shown in FIG. 7*a* by step 705.

In some embodiments for a local multicast session and a UE previously outside the service area but now inside the updated service area, the SMF may also add associated QoS flows for the multicast session to the PDU session.

This is shown in FIG. 7*b* which shows determine a multicast session with location dependent content within the indicated location area as shown in step 711.

Following this the SMF determines the affected multicast session ID, possible area session ID, QoS flows for the multicast and updated service area as shown in FIG. 7*b* by step 713.

The SMF can then be configured then provides in a N2 SM container the information as shown in FIG. 7*b* by step 715.

For a UE previously inside the service area but now outside the updated service area, the SMF may also signal via AMF towards RAN that the UE was removed from the multicast session, e.g. by removing all multicast session related information from the PDU session, or the SMF may remove associated QoS flows for the multicast session from the PDU session.

This is shown with respect to FIG. 7*c* wherein the SMF is configured to determine a local multicast session and for a UE previously inside the service area but now outside the updated service area as shown in step 721. Then the SMF is configured to signal one of: that the affected user equipment was removed from the multicast/broadcast service session by removing all multicast service session related information from the protocol data unit session or the removal of associated (unicast) quality of service flows for the multicast service session from the protocol data unit session as shown in FIG. 7*c* by step 723.

Figure 7D:
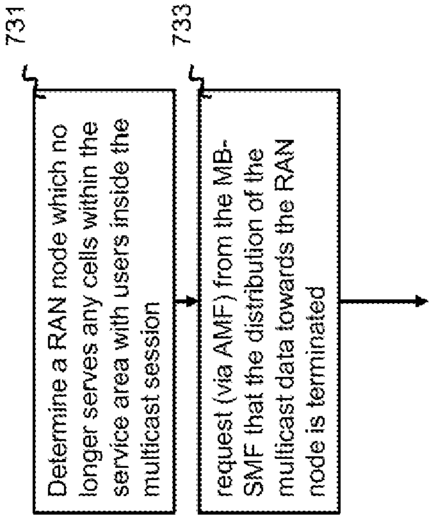
FIGS. 7*d* to 7*e* show example flow diagrams showing update operations with respect to the RAN according to some embodiments.
Figure 7E:
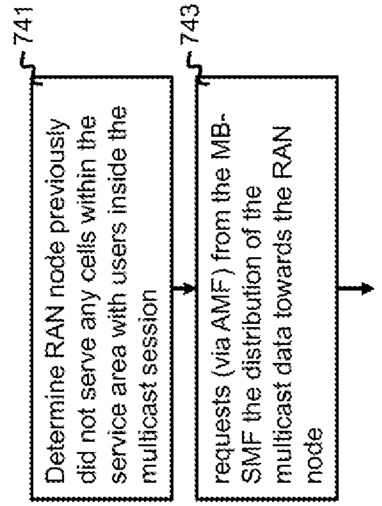

With respect to FIGS. 7*d* and 7*e* are shown further flow diagrams showing RAN update processes. For example with respect to FIG. 7*d* is shown determining a RAN node which no longer serves any cells within the service area with users inside the multicast session as shown in step 731.

Then the RAN is configured to request (via AMF) from the MB-SMF that the distribution of the multicast data towards the RAN node is terminated as shown in FIG. 7*d* by step 733.

Furthermore if the RAN node previously did not serve any cells within the service area with users inside the multicast session, it also requests (via AMF) from the MB-SMF the distribution of the multicast data towards the RAN node.

This is shown in FIG. 7*e* wherein the RAN is configured to determine a RAN node previously did not serve any cells within the service area with users inside the multicast session as shown in step 741.

Then the RAN is configured to requests (via AMF) from the MB-SMF the distribution of the multicast data towards the RAN node as shown in FIG. 7*e* by step 743.

Figure 8:
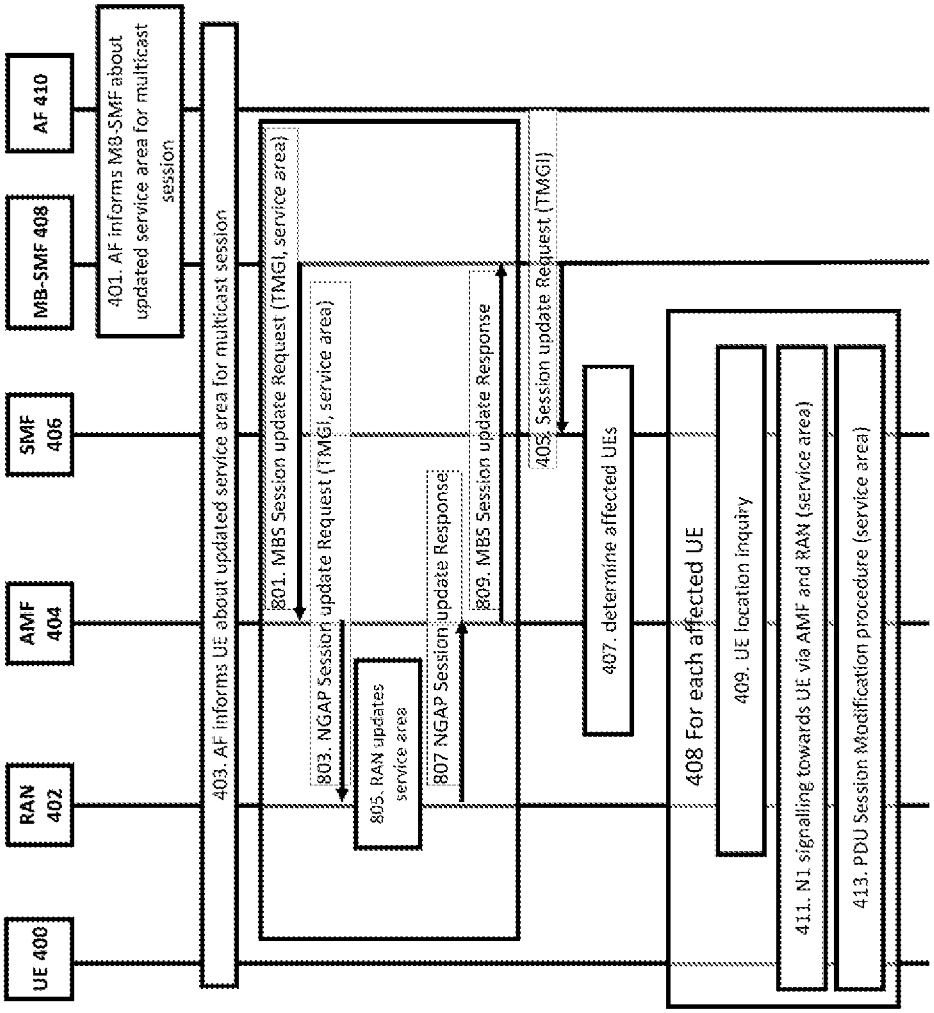
FIG. 8 shows a further workflow diagram with respect to an example multicast session update procedure according to some embodiments.

With respect to FIG. 8 is shown a further workflow diagram with respect to an example multicast session update procedure according to some further embodiments. The workflow differs from that shown with respect to FIG. 4 in that additional steps 801, 803, 805, 807 and 809 are configured to enable data transmission towards cells served by the RAN node previously in the multicast service area and now outside the updated multicast service area to be terminated as quickly as possible.

Thus for example, as shown in FIG. 8 by step 801, the MB-SMF 408 is configured to send a MBS Session update Request to the AMF(s) 404 handling RAN nodes within the multicast session. In some embodiments the request can be sent as N2 session management (SM) message comprising the temporary mobile group identity (TMGI) and QoS profiles and furthermore possible Area Session ID values. In some embodiments the request is sent for multicast sessions with location dependent content within the same location area. In some embodiments the MB-SMF is configured to alternatively inform only RAN nodes handling the multicast session but where the multicast service area was restricted in such a way that some or all cells served by the RAN node previously in the multicast service area are now outside the updated multicast service area.

Furthermore, as shown in FIG. 8 by step 803 the involved AMF 404 forwards the N2 SM information received from the MB-SMF 408 to the RAN nodes 402 via a NGAP Session update Request. Thus for example can in some embodiments be implemented by a N2 SM message comprising TMGI, QoS profiles for multicast.

Additionally, as shown in FIG. 8 by step 805, the NG-RAN (comprising RAN nodes 402) is configured to update the MBS session context with the new service area.

In some embodiments when a RAN node 402 is informed via a MB-SMF about an updated service area of the multicast session and some cells it serves previously within the service area are now outside the updated service area it ends transmission of the related multicast data towards those cells.

If the RAN node 402 no longer serves any cells within the service area with users inside the multicast session, it can be configured to request (via the AMF 404) from the MB-SMF 408 that the distribution of the multicast data towards the RAN node 402 is terminated.

In some embodiments, such as shown in FIG. 8 by step 807, the NG-RAN (the RAN node 402) is configured to acknowledge the received NGAP Session update Request by sending a suitable NGAP Session update Response message to the AMF 404.

Then the AMF 404, having received the response, is configured to send the MBS Session update Response to the MB-SMF 408.

Figure 9:
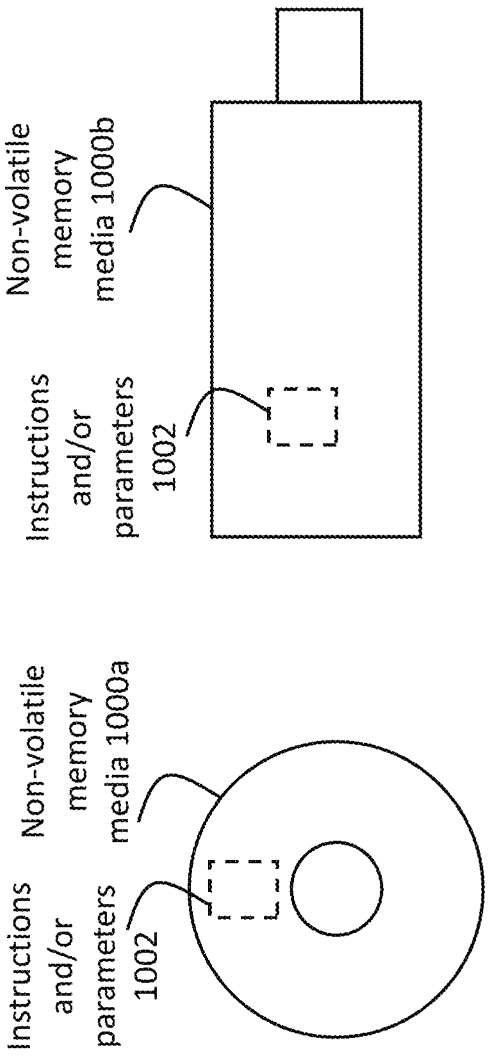
FIG. 9 shows a schematic representation of a non-volatile memory medium storing instructions which when executed by a processor allow a processor to perform one or more of the steps of the methods described herein.

FIG. 9 shows a schematic representation of non-volatile memory media 1000*a* (e.g. computer disc (CD) or digital versatile disc (DVD)) and 1000*b* (e.g. universal serial bus (USB) memory stick) storing instructions and/or parameters 1002 which when executed by a processor allow the processor to perform one or more of the steps of the methods as described above.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 7 and 8, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally, some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A user equipment, comprising:

at least one processor; and at least one memory storing instructions that, when executed by the at least one processor, cause the user equipment to:

join a multicast service session:

receive a notification about a changed multicast service area for the multicast session, wherein the notification comprises information about a multicast session identifier and an updated multicast service area, wherein the notification about the changed multicast service area for the multicast session is received within an N1 SM container of the multicast session;

determine whether the user equipment is located within the changed multicast service area for the multicast session;

in response to the determination that the user equipment is not within the changed multicast service area for the multicast session, terminate monitoring radio signaling related to the multicast session;

in response to the determination that the user equipment is within the changed multicast service area for the multicast session, monitor radio signaling related to the multicast session; and release resources for reception of data relating to the multicast session when it is determined that the user equipment is not within the changed service area in response to receiving a related notification within an N1 message container.

2. The user equipment of claim 1, wherein the notification is received in a PDU Session Modification Command message.

3. The user equipment of claim 2, wherein the notification is received in a Received MBS container information element of the PDU Session Modification Command message.

4. The user equipment of claim 3, wherein the Received MBS container information element includes an MBS decision field set to indicate an MBS service area update.

5. The user equipment of claim 1, wherein the updated multicast service area comprises at least one of: an MBS Tracking Area Identity (TAI) list, or a New Radio Cell Global Identifier (NR CGI) list.

6. The user equipment of claim 1, wherein the instructions, when executed by the at least one processor, further cause the user equipment to: obtain service area information via at least one of MBS service announcement or NAS signalling.

7. The user equipment of claim 1, wherein, when the multicast session is inactive and the user equipment is outside the changed multicast service area, the instructions cause the user equipment to refrain from monitoring session activation notifications related to the multicast session.

8. The user equipment of claim 1, wherein the related notification indicates that the user equipment has been removed from the multicast session.

9. The user equipment of claim 8, wherein the related notification includes a cause indicating that the user equipment is outside the MBS service area.

10. The user equipment of claim 1, wherein releasing resources comprises releasing QoS flows associated with individual delivery of the multicast session.

11. The user equipment of claim 1, wherein the changed multicast service area results from a multicast session update procedure initiated by an application function.

12. The user equipment of claim 1, wherein the notification about the changed multicast service area is received via a PDU Session Modification procedure.

13. The user equipment of claim 1, wherein the multicast session is a local MBS service session having a defined MBS service area.

14. The user equipment of claim 1, wherein the multicast session is a location-dependent MBS service session, and wherein the multicast session identifier comprises an MBS Session ID.

15. A method performed by a user equipment, comprising:
- joining a multicast service session;
- receiving a notification about a changed multicast service area for the multicast session, wherein the notification comprises information about a multicast session identifier and an updated multicast service area, wherein the notification about the changed multicast service area for the multicast session is received within an N1 SM container of the multicast session;
- determining whether the user equipment is located within the changed multicast service area for the multicast session;
- in response to the determination that the user equipment is not within the changed multicast service area for the multicast session, terminating monitoring radio signaling related to the multicast session;
- in response to the determination that the user equipment is within the changed multicast service area for the multicast session, monitoring radio signaling related to the multicast session; and
- releasing resources for reception of data relating to the multicast session when it is determined that the user equipment is not within the changed service area in response to receiving a related notification within an N1 message container.

16. The method of claim 15, wherein the notification is received in a PDU Session Modification Command message.

17. The method of claim 16, wherein the notification is received in a Received MBS container information element of the PDU Session Modification Command message.

18. The method of claim 17, wherein the Received MBS container information element includes an MBS decision field set to indicate an MBS service area update.

19. The method of claim 15, wherein the updated multicast service area comprises at least one of: an MBS Tracking Area Identity (TAI) list, or a New Radio Cell Global Identifier (NR CGI) list.

20. The method of claim 15, further comprising: obtaining service area information via at least one of MBS service announcement or NAS signalling.

21. The method of claim 15, wherein, when the multicast session is inactive and the user equipment is outside the changed multicast service area, the method further comprises refraining from monitoring session activation notifications related to the multicast session.

22. The method of claim 15, wherein the related notification indicates that the user equipment has been removed from the multicast session.

23. The method of claim 22, wherein the related notification includes a cause indicating that the user equipment is outside the MBS service area.

24. The method of claim 15, wherein releasing resources comprises releasing QoS flows associated with individual delivery of the multicast session.

25. The method of claim 15, wherein the changed multicast service area results from a multicast session update procedure initiated by an application function.

26. The method of claim 15, wherein the notification about the changed multicast service area is received via a PDU Session Modification procedure.

27. The method of claim 15, wherein the multicast session is a local MBS service session having a defined MBS service area.

28. The method of claim 15, wherein the multicast session is a location- dependent MBS service session, and wherein the multicast session identifier comprises an MBS Session ID.

29. A non-transitory computer-readable medium storing instructions that, when executed by at least one processor of a user equipment, cause the user equipment to perform a method comprising:
- joining a multicast service session;
- receiving a notification about a changed multicast service area for the multicast session, wherein the notification comprises information about a multicast session identifier and an updated multicast service area, wherein the notification about the changed multicast service area for the multicast session is received within an N1 SM container of the multicast session;
- determining whether the user equipment is located within the changed multicast service area for the multicast session;
- in response to the determination that the user equipment is not within the changed multicast service area for the multicast session, terminating monitoring radio signaling related to the multicast session;
- in response to the determination that the user equipment is within the changed multicast service area for the multicast session, monitoring radio signaling related to the multicast session; and releasing resources for reception of data relating to the multicast session when it is determined that the user equipment is not within the changed service area in response to receiving a related notification within an N1 message container.

30. An apparatus comprising:

means for joining a multicast service session;

means for receiving a notification about a changed multicast service area for the multicast session, wherein the notification comprises information about a multicast session identifier and an updated multicast service area, wherein the notification about the changed multicast service area for the multicast session is received within an N1 SM container of the multicast session;

means for determining whether the apparatus is located within the changed multicast service area for the multicast session;

means for terminating monitoring radio signaling related to the multicast session in response to a determination that the apparatus is not within the changed multicast service area for the multicast session;

means for monitoring radio signaling related to the multicast session in response to a determination that the apparatus is within the changed multicast service area for the multicast session; and means for releasing resources for reception of data relating to the multicast session when it is determined that the apparatus is not within the changed service area in response to receiving a related notification within an N1 message container.

* * * * *